(12) United States Patent
Huang

(10) Patent No.: US 10,868,307 B2
(45) Date of Patent: Dec. 15, 2020

(54) HIGH-PERFORMANCE ELECTRODES EMPLOYING SEMI-CRYSTALLINE BINDERS

(71) Applicant: GM Global Technology Operations LLC, Detroit, MI (US)

(72) Inventor: Xiaosong Huang, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 44 days.

(21) Appl. No.: 16/034,067

(22) Filed: Jul. 12, 2018

(65) Prior Publication Data
US 2020/0020949 A1 Jan. 16, 2020

(51) Int. Cl.
| H01M 4/62 | (2006.01) |
| H01M 4/04 | (2006.01) |
| H01M 10/0525 | (2010.01) |
| H01M 4/38 | (2006.01) |
| H01M 4/1395 | (2010.01) |

(52) U.S. Cl.
CPC ......... *H01M 4/622* (2013.01); *H01M 4/0404* (2013.01); *H01M 4/1395* (2013.01); *H01M 4/386* (2013.01); *H01M 10/0525* (2013.01)

(58) Field of Classification Search
CPC .................................................. H01M 4/622
See application file for complete search history.

(56) References Cited

U.S. PATENT DOCUMENTS

| 3,819,569 | A | * | 6/1974 | Baird | ........................ C08K 3/26 |
| | | | | | 524/424 |
| 5,891,593 | A | | 4/1999 | Keller et al. | |
| 6,451,487 | B1 | | 9/2002 | Besner et al. | |
| 7,018,607 | B2 | | 3/2006 | Nazri et al. | |
| 7,285,260 | B2 | | 10/2007 | Armand et al. | |
| 7,457,018 | B2 | | 11/2008 | Armand et al. | |
| 7,491,467 | B2 | | 2/2009 | Satoh et al. | |
| 7,651,732 | B2 | | 1/2010 | Cheng et al. | |
| 7,722,994 | B2 | | 5/2010 | Halalay | |
| 7,736,805 | B2 | | 6/2010 | Nazri et al. | |
| 8,076,027 | B2 | | 12/2011 | Honda et al. | |
| 8,101,152 | B1 | | 1/2012 | Halalay et al. | |
| 8,148,455 | B2 | | 4/2012 | Posudievsky et al. | |
| 8,247,116 | B2 | | 8/2012 | He et al. | |
| 8,309,644 | B1 | | 11/2012 | Huang | |
| 8,399,138 | B2 | | 3/2013 | Timmons | |
| 8,420,259 | B2 | | 4/2013 | Xiao et al. | |
| 8,440,350 | B1 | | 5/2013 | Verbrugge et al. | |
| 8,455,140 | B1 | | 6/2013 | Huang et al. | |
| 8,460,591 | B2 | | 6/2013 | Huang et al. | |
| 8,460,829 | B1 | | 6/2013 | Huang et al. | |
| 8,470,468 | B2 | | 6/2013 | Xiao et al. | |
| 8,470,898 | B2 | | 6/2013 | Huang | |
| 8,641,860 | B2 | | 2/2014 | Flores et al. | |
| 8,642,201 | B2 | | 2/2014 | Cheng et al. | |
| 8,658,295 | B2 | | 2/2014 | Cheng et al. | |
| 8,679,680 | B2 | | 3/2014 | Vanimisetti et al. | |
| 8,753,543 | B2 | | 6/2014 | Zhamu et al. | |
| 8,828,481 | B2 | | 9/2014 | Burton et al. | |
| 8,835,056 | B2 | | 9/2014 | Xiao et al. | |
| 8,974,946 | B2 | | 3/2015 | Cai | |
| 8,999,584 | B2 | | 4/2015 | Jiang et al. | |
| 9,012,075 | B2 | | 4/2015 | Verbrugge et al. | |
| 9,034,519 | B2 | | 5/2015 | Xiao et al. | |
| 9,059,451 | B2 | | 6/2015 | Xiao et al. | |
| 9,093,705 | B2 | | 7/2015 | Xiao et al. | |
| 9,123,939 | B2 | | 9/2015 | Xiao et al. | |
| 9,143,830 | B2 | | 9/2015 | Sakai et al. | |
| 9,153,819 | B2 | | 10/2015 | Huang et al. | |
| 9,160,036 | B2 | | 10/2015 | Yang et al. | |
| 9,356,281 | B2 | | 5/2016 | Verbrugge et al. | |
| 9,362,551 | B2 | | 6/2016 | Sachdev et al. | |

(Continued)

FOREIGN PATENT DOCUMENTS

| CN | 101107746 A | 1/2008 |
| CN | 101385163 A | 3/2009 |

(Continued)

OTHER PUBLICATIONS

Zheng Long Xu et al.; "Electrospun Carbon Nanofiber Anodes Containing Monodispersed Si Nanoparticles and Graphene Oxide with Exceptional High Rate Capacities"; Nano Energy, vol. 6; May, 2014; pp. 27-35.

Bai, Ying, et al., "Microstructure and electrochemical performances of LiF-coated spinel LiMn2O4," Transactions of Nonferrous Metals Society of China, vol. 17, rm. s892-s896 (2007).

Gaines, Linda, et al., "Costs of Lithium-Ion Batteries for Vehicles," Argonne National Laboratory, Center for Transportation Research (May 2000).

Lee, Won-Jun, et al., "A Comparative Study on the Si Precursors for the Atomic Layer Deposition of Silicon Nitride Thin Films," Journal of the Korean Physical Society, vol. 45, No. 5, pp. 1352-1355 (Nov. 2004).

Qin, Yan, et al., "Mechanism of L TO Gassing and potential solutions," Argonne National Laboratory Presentation, May 9-13, 2011 (18 pages).

Aurbach, Doron, et al., "Design of electrolyte solutions for Li and Li-ion batteries: a review," Electrochimica Acta, vol. 50, pp. 247-254 (2004)(published online Aug. 3, 2004).

(Continued)

*Primary Examiner* — Austin Murata
(74) *Attorney, Agent, or Firm* — Quinn IP Law

(57) ABSTRACT

High performance electrodes for electrochemical devices having a semi-crystalline binder are disclosed. A method of forming an electrode includes forming an electrode slurry, applying the electrode slurry to a current collector to form an electrode, and curing the electrode to thereby form the semi-crystalline binder. The electrode slurry includes a solvent, a semi-crystalline-binder precursor solution, an electroactive material, and an electrically conductive filler. The semi-crystalline binder includes the electroactive material and the electrically conductive filler dispersed therethrough. The semi-crystalline binder includes a plurality of polymer chains. Each of the plurality of polymer chains includes a plurality of crystalline sites interspersed with a plurality of amorphous sites. The semi-crystalline binder is capable of forming hydrogen bonds.

20 Claims, 2 Drawing Sheets

(56) References Cited

U.S. PATENT DOCUMENTS

| | | |
|---|---|---|
| 9,362,552 B2 | 6/2016 | Sohn et al. |
| 9,379,374 B2 | 6/2016 | Liu et al. |
| 9,947,915 B2 | 4/2018 | Kim et al. |
| 2002/0075627 A1 | 6/2002 | Shinozaki et al. |
| 2006/0147797 A1 | 7/2006 | Wu et al. |
| 2007/0087178 A1 | 4/2007 | Hendriks et al. |
| 2007/0099081 A1 | 5/2007 | Matsuda et al. |
| 2007/0202411 A1 | 8/2007 | Kim et al. |
| 2007/0238023 A1 | 10/2007 | Gorshkov et al. |
| 2007/0275302 A1 | 11/2007 | Sotowa et al. |
| 2008/0063939 A1 | 3/2008 | Ryu et al. |
| 2008/0226987 A1 | 9/2008 | Yumoto et al. |
| 2008/0261116 A1 | 10/2008 | Burton et al. |
| 2009/0111031 A1 | 4/2009 | Hirose et al. |
| 2009/0136415 A1 | 5/2009 | Gorshkov et al. |
| 2009/0140742 A1 | 6/2009 | Koch et al. |
| 2009/0155697 A1 | 6/2009 | Park et al. |
| 2009/0233171 A1* | 9/2009 | Naruse .................. H01G 11/38 429/209 |
| 2009/0253042 A1 | 10/2009 | Sun et al. |
| 2009/0286157 A1 | 11/2009 | Chen et al. |
| 2009/0325069 A1 | 12/2009 | Anada et al. |
| 2009/0325071 A1 | 12/2009 | Verbrugge et al. |
| 2010/0079145 A1 | 4/2010 | Meisner et al. |
| 2010/0133482 A1* | 6/2010 | Abusleme .............. B01D 69/02 252/511 |
| 2010/0143790 A1 | 6/2010 | Inagaki et al. |
| 2010/0203392 A1 | 8/2010 | Yamada et al. |
| 2010/0272612 A1 | 10/2010 | Ramamurthy |
| 2010/0330421 A1 | 12/2010 | Cui et al. |
| 2011/0017528 A1 | 1/2011 | Kumar et al. |
| 2011/0027649 A1 | 2/2011 | Abe |
| 2011/0037436 A1 | 2/2011 | Seethaler et al. |
| 2011/0044886 A1 | 2/2011 | Gorshkov et al. |
| 2011/0062379 A1 | 3/2011 | Miyawaki et al. |
| 2011/0086249 A1 | 4/2011 | Timmons |
| 2011/0086294 A1 | 4/2011 | Xiao et al. |
| 2011/0111294 A1 | 5/2011 | Lopez et al. |
| 2011/0111308 A1 | 5/2011 | Halalay et al. |
| 2011/0121225 A1 | 5/2011 | Posudievslcy et al. |
| 2011/0151333 A1 | 6/2011 | Halalay et al. |
| 2011/0165459 A1 | 7/2011 | Halalay et al. |
| 2011/0166811 A1 | 7/2011 | Koch et al. |
| 2011/0189577 A1 | 8/2011 | Chung et al. |
| 2011/0200781 A1 | 8/2011 | Sowul et al. |
| 2011/0200863 A1 | 8/2011 | Xiao et al. |
| 2011/0224928 A1 | 9/2011 | Lin et al. |
| 2011/0250478 A1 | 10/2011 | Timmons et al. |
| 2011/0274962 A1 | 11/2011 | Inagaki et al. |
| 2012/0003533 A1 | 1/2012 | Dahn et al. |
| 2012/0086457 A1 | 4/2012 | Meisner et al. |
| 2012/0100403 A1 | 4/2012 | Wang et al. |
| 2012/0101674 A1 | 4/2012 | Wang et al. |
| 2012/0105068 A1 | 5/2012 | Wang et al. |
| 2012/0105069 A1 | 5/2012 | Wang et al. |
| 2012/0109503 A1 | 5/2012 | Yang et al. |
| 2012/0156568 A1 | 6/2012 | Kia et al. |
| 2012/0156569 A1 | 6/2012 | Kia et al. |
| 2012/0161757 A1 | 6/2012 | Koch et al. |
| 2012/0161776 A1 | 6/2012 | Koch et al. |
| 2012/0169297 A1 | 7/2012 | Schaefer et al. |
| 2012/0208087 A1 | 8/2012 | Yamamoto et al. |
| 2012/0219852 A1 | 8/2012 | Huang et al. |
| 2012/0227252 A1 | 9/2012 | Nazri |
| 2012/0229096 A1 | 9/2012 | Nazri |
| 2012/0231321 A1 | 9/2012 | Huang et al. |
| 2012/0244390 A1 | 9/2012 | Cheng et al. |
| 2012/0244418 A1 | 9/2012 | Cheng et al. |
| 2012/0264017 A1 | 10/2012 | Nazri et al. |
| 2012/0270103 A1 | 10/2012 | Lee et al. |
| 2012/0301790 A1 | 11/2012 | Xiao et al. |
| 2012/0308853 A1 | 12/2012 | Vanimisetti et al. |
| 2012/0308872 A1 | 12/2012 | Huang |
| 2012/0328927 A1 | 12/2012 | Timmons et al. |
| 2013/0071736 A1 | 3/2013 | Xiao et al. |
| 2013/0071742 A1 | 3/2013 | Halalay et al. |
| 2013/0099159 A1 | 4/2013 | Halalay et al. |
| 2013/0122374 A1 | 5/2013 | Verbrugge et al. |
| 2013/0131200 A1 | 5/2013 | Huang |
| 2013/0157125 A1 | 6/2013 | Sachdev et al. |
| 2013/0175998 A1 | 7/2013 | Wang et al. |
| 2013/0177804 A1 | 7/2013 | Verbrugge et al. |
| 2013/0177808 A1 | 7/2013 | Wang et al. |
| 2013/0183582 A1 | 7/2013 | Halalay et al. |
| 2013/0189576 A1 | 7/2013 | Verbrugge et al. |
| 2013/0224602 A1 | 8/2013 | Huang |
| 2013/0234674 A1 | 9/2013 | Nazri |
| 2013/0284338 A1 | 10/2013 | Xiao et al. |
| 2013/0316231 A1 | 11/2013 | Iijima et al. |
| 2013/0319599 A1 | 12/2013 | Huang |
| 2013/0323595 A1 | 12/2013 | Sohn et al. |
| 2014/0011089 A1 | 1/2014 | Yamada et al. |
| 2014/0023931 A1 | 1/2014 | Huang |
| 2014/0038024 A1 | 2/2014 | Huang |
| 2014/0113197 A1 | 4/2014 | Xiao et al. |
| 2014/0205905 A1 | 7/2014 | Xiao et al. |
| 2014/0265557 A1 | 9/2014 | Huang et al. |
| 2014/0272526 A1 | 9/2014 | Huang |
| 2014/0272558 A1 | 9/2014 | Xiao et al. |
| 2014/0272569 A1 | 9/2014 | Cai et al. |
| 2014/0272573 A1 | 9/2014 | Xiao et al. |
| 2014/0272578 A1 | 9/2014 | Xiao et al. |
| 2014/0272584 A1 | 9/2014 | Jiang et al. |
| 2014/0272603 A1 | 9/2014 | Yang et al. |
| 2015/0010817 A1 | 1/2015 | Cui et al. |
| 2015/0014890 A1 | 1/2015 | Xiao |
| 2015/0037651 A1 | 2/2015 | Huang |
| 2015/0125760 A1* | 5/2015 | Smith .................... H01G 11/62 429/338 |
| 2015/0162602 A1 | 6/2015 | Dadheech et al. |
| 2015/0180023 A1 | 6/2015 | Xiao et al. |
| 2015/0191570 A1* | 7/2015 | Garcia Perez ......... C08G 69/26 524/606 |
| 2015/0228980 A1 | 8/2015 | Huang |
| 2017/0317387 A1 | 11/2017 | Inoue et al. |
| 2018/0287146 A1 | 10/2018 | Suzuki et al. |

FOREIGN PATENT DOCUMENTS

| | | |
|---|---|---|
| CN | 101764209 A | 3/2010 |
| CN | 101728517 A | 6/2010 |
| CN | 101986442 A | 3/2011 |
| CN | 102306748 A | 1/2012 |
| CN | 103779550 A | 5/2014 |
| CN | 103943819 A | 7/2014 |
| CN | 104701487 A | 6/2015 |
| DE | 102013220351 A1 | 4/2014 |
| DE | 102014118089 A1 | 6/2015 |
| FR | 2965408 A1 | 3/2012 |
| JP | 2008062727 A1 | 3/2010 |
| JP | 2010093027 A | 4/2010 |
| JP | 5370289 B2 | 1/2012 |
| WO | 2007094635 A1 | 8/2007 |
| WO | 2012132396 A1 | 10/2012 |
| WO | 2011078263 A1 | 5/2013 |
| WO | 2014022986 A1 | 2/2014 |
| WO | 2014182281 A1 | 11/2014 |
| WO | 2015176241 A1 | 11/2015 |

OTHER PUBLICATIONS

George, Steven M., "Atomic Layer Deposition: An Overview," Chem. Rev., vol. 110, No. 1, pp. 111-131 (2010) (published on line Nov. 30, 2009).

Goldstein, David N., et al., "Al2O3 Atomic Layer Deposition with Trimethylaluminum and Ozone Studied by in Situ Transmission FTIR Spectroscopy and Quadrupole Mass Spectrometry," J. Phys. Chem. C, vol. 112, No. 49, pp. 19530-19539 (2008) (published online Nov. 13, 2008).

Leskela, Markku, et al., "Atomic layer deposition (ALO): from precursors to thin film structures," Thin Solid Films, vol. 409, pp. 138-146 (2002).

(56) References Cited

OTHER PUBLICATIONS

Nikkei Electronics, "New Anode Material Could Boost Lithium Battery Performance by 30 Percent," available at http://www.greentechmedia.com/articles/read/new-anode-material-could-boost-lithium-battery-performance-by-30-percent (Nov. 2, 2010) (2pages).
Ramadass, Premanand, et al., "Mathematical Modeling of SEI Formation in Li-Ion Cell Anodes," 202nd Meeting of the Electrochemical Society—Salt Lake City, UT, Oct. 20-25, 2002, (Abstract) (10 pages) (Oct. 23, 2002).
Vetter, J., et al., "Ageing mechanisms in lithium-ion batteries," J. Power Sources, vol. 147, Nos. 1-2, pp. 269-281 (Sep. 9, 2005).
Huntsman Corporation, Jeffamine.RTM. ED-2003 Polyetheramine Technical Bulletin, Form 5197-0208 (2007) (2 pages).
Franssila, Sami, Introduction to Microfabrication, Second Ed., p. 53 (2010).
A Second Office Action in Chinese Application No. 201310489603.8 from the State Intellectual Property Office (SIPO) dated May 22, 2016, and correspondence from China Patent Agent (H.K.) summarizing the Second Office Action; 11 pages.
A First Office Action in Chinese Application No. 201310489603.8 from the State Intellectual Property Office (SIPO) dated Jul. 31, 2015, and correspondence from China Patent Agent (H.K.) summarizing the First Office Action; 12 pages.
A First Office Action in Chinese App. No. 201410017174.9 from the State Intellectual Property Office dated Oct. 10, 2015; 12 pages.
A First Office Action in Chinese Application No. 201410750591.4 from the Chinese Patent Office dated Jul. 5, 2016 and correspondence from China Patent Agent (H.K.) summarizing the First Office Action; 9 pages.
Xingcheng Xiao et al.; "Ultrathin Multifunctional Oxide Coatings for Lithium Ion Batteries"; D Advanced Materials, vol. 23, No. 34; Jul. 22, 2011; pp. 3911-3915.
Yoon Seok Jung et al.; "Ultrathin Direct Atomic Layer Deposition on Composite Electrodes for Highly Durable and Safe Li-Ion Batteries"; Advanced Materials, vol. 22, No. 19; Apr. 6, 2010; pp. 2172-2176.
A second Office Action in Chinese Application No. 201410017174.9 from the Chinese Patent Office dated Aug. 3, 2016 and correspondence from China Patent Agent (H.K.) summarizing the First Office Action; 15 pages.
U.S. Appl. No. 16/034,051, filed Jul. 12, 2018.

\* cited by examiner

HIGH-PERFORMANCE ELECTRODES EMPLOYING SEMI-CRYSTALLINE BINDERS

INTRODUCTION

The present disclosure relates to high-performance electrodes for lithium-ion electrochemical devices, and more particularly to semi-crystalline binders for optimizing electrode performance in lithium-ion electrochemical devices.

High-energy density electrochemical cells, such as lithium-ion batteries may be used in a variety of consumer products, such as mobile devices including laptops, tablets, and cellular telephones, and vehicles, such as Hybrid Electric Vehicles ("HEVs") and Electric Vehicles ("EVs"), and the like.

High-performance electrodes for electrochemical cells suffer from significant drawbacks. For example, electrodes with silicon-containing electroactive materials experience a large amount of Coulombic fade during charge-discharge cycles. Volume changes during charge-discharge cycles may limit performance and/or lifetime of the battery.

SUMMARY

While not being bound by theory, diminished performance and/or lifetime of the battery is believed to be generally due to the breakdown in physical contact of the conductive fillers with the electroactive material and current collectors caused by the volume changes that the electroactive particles undergo during charge-discharge cycles. While not being bound by theory, the diminished performance and/or lifetime of the battery is believed to also be due to cracking and reformation of the solid electrolyte interphase on the electroactive particles during the volume changes during charge-discharge cycles.

Systems and methods in accordance with the present disclosure provide optimized performance and/or lifetime of the battery through the use of a stable, semi-crystalline binder. The semi-crystalline binder includes a crystalline phase and an amorphous phase. Beneficially, the crystalline phase provides rigidity of the binder and resilience against expansion of the electroactive particles, and the amorphous phase allows the binder to maintain physical contact with the electroactive particles during contraction thereof. Further benefits provided by the semi-crystalline binder will be recognized with reference to the detailed description.

According to aspects of the present disclosure, a method of forming an electrode for an electrochemical cell includes forming an electrode slurry, applying the electrode slurry to a current collector, and curing the electrode slurry to thereby form the electrode having a semi-crystalline binder. The electrode slurry includes a semi-crystalline-binder precursor solution, an electroactive material, and an electrically conductive filler. The semi-crystalline binder includes the electroactive material and the electrically conductive filler dispersed therethrough. The semi-crystalline binder includes a plurality of polymer chains. Each of the plurality of polymer chains includes a plurality of crystalline sites interspersed with a plurality of amorphous sites. Each of the plurality of crystalline sites is defined by repeating interactions between segments of the polymer chains.

According to further aspects of the present disclosure, the semi-crystalline-binder precursor solution includes a first monomer and a second monomer selected to produce a polymer chain having at least 25% aromaticity by atom on a basis of atoms in the polymer chain and at least one site configured to form a hydrogen bond with an adjacent polymer chain in each repeating unit.

According to further aspects of the present disclosure, the semi-crystalline-binder precursor solution is an amorphous aramid obtained by treatment of a crystalline aramid. The treatment includes dissolving the crystalline aramid in a salt-containing organic solution to thereby form a solution, treating the solution with water to thereby form an amorphous aramid, and dissolving the amorphous aramid in a pure organic solution to produce an amorphous aramid solution.

According to further aspects of the present disclosure, the crystalline aramid is formed by mixing a first monomer and a second monomer and polymerizing the first monomer and the second monomer to form the crystalline aramid. The first monomer and the second monomer are selected to produce a polymer chain having at least 25% aromaticity by atom on a basis of atoms in the polymer chain and at least one site configured to form a hydrogen bond with an adjacent polymer chain.

According to further aspects of the present disclosure, each of the plurality of polymer chains includes an aromaticity greater than about 25% by atom on a basis of atoms within the respective polymer chain and a plurality of hydrogen bonds to provide physical cross-linking and form a good adhesion with the surface of the active materials.

According to further aspects of the present disclosure, each polymer chain includes hydrogen in an amount greater than about 15% by atom on a basis of atoms within the respective polymer chain.

According to further aspects of the present disclosure, the semi-crystalline precursor is formed from a first monomer that is a diamine and a second monomer that is an acid chloride.

According to further aspects of the present disclosure, the diamine is m-phenylenediamine and wherein the acid chloride is isophthaloyl dichloride.

According to further aspects of the present disclosure, the semi-crystalline binder is an aramid.

According to further aspects of the present disclosure, the aramid is poly(m-phenylene isophthalamide).

According to further aspects of the present disclosure, curing the semi-crystalline binder includes drying the electrode, exposing the dry electrode to a liquid electrolyte, and maintaining the liquid electrolyte at ambient temperature for a predetermined time.

According to further aspects of the present disclosure, the predetermined time is at least one week.

According to further aspects of the present disclosure, the curing includes drying the electrode and exposing the dry electrode to an elevated temperature for a first predetermined time.

According to further aspects of the present disclosure, the elevated temperature is between a glass-transition temperature of the semi-crystalline binder and a decomposition temperature of the semi-crystalline binder.

According to aspects of the present disclosure, an electrode includes an electroactive material, an electrically conductive filler, and a semi-crystalline binder having the electroactive material and the electrically conductive filler dispersed therethrough. The electroactive material undergoes a volume change during charging and discharging of a battery cell. The electrically conductive filler is configured to carry electrical energy from the electroactive material. The semi-crystalline binder includes a plurality of polymer chains. Each of the plurality of polymer chains includes a plurality of crystalline sites interspersed with a plurality of amorphous sites. Each of the plurality of crystalline sites defined by the repeating interactions between segments of the polymer chains.

According to further aspects of the present disclosure, the electroactive material includes silicon, silicon oxides, or silicon alloys.

According to further aspects of the present disclosure, the semi-crystalline binder is an aramid.

According to further aspects of the present disclosure, the semi-crystalline binder is poly(m-phenylene isophthalamide).

According to further aspects of the present disclosure, each of the plurality of polymer chains includes an aromaticity greater than about 25% by atom on a basis of atoms within the respective polymer chain and a plurality of hydrogen bonds to provide physical cross-linking and form good adhesion with the surface of the active materials.

According to further aspects of the present disclosure, each of the plurality of polymer chains includes an aromaticity greater than about 37% by atom on a basis of atoms within the respective polymer chain.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
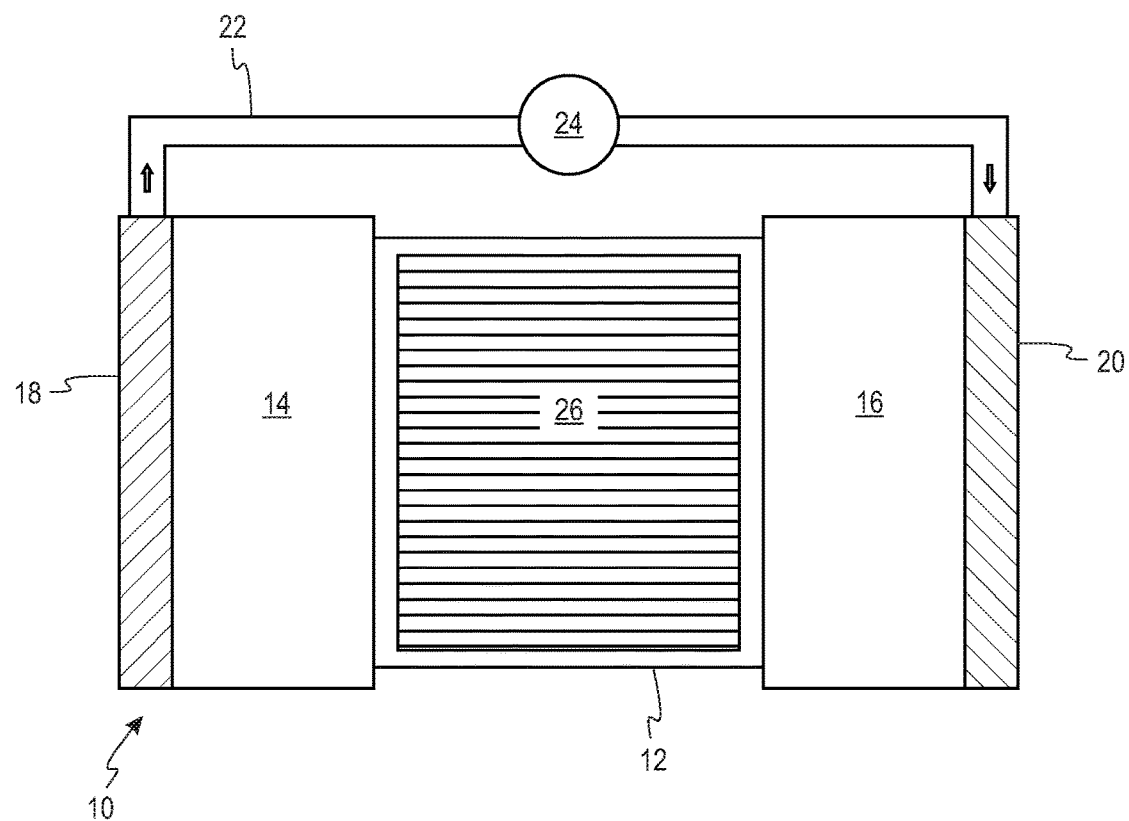
FIG. 1 illustrates a schematic view of an exemplary electrochemical battery cell including a semi-crystalline binder, according to aspects of the present disclosure.

The present disclosure pertains to electrochemical cells, and more particularly to high-performance lithium-ion electrochemical cells (e.g., lithium-ion batteries) having optimized electrodes.

Certain electroactive materials used to form the electrode, such as silicon, may provide a high specific capacity, but undergo large volume changes during charge-discharge cycles. For example, silicon-containing electroactive materials are believed to expand volume by 300% or more during standard charge-discharge cycles. While not being bound by theory, it is believed that reduced performance of battery cells using these electrodes (e.g., Coulombic fade) occurs due the large volume changes during the charge-discharge cycle. Moreover, each charge-discharge cycle undergone by these electrodes generally reduces the Coulombic charge capacity of the electrode. While not being bound by theory, it is believed that breakdown of physical contact between the electroactive material and other components of the electrode (e.g., electrically conductive filler and binder) during the expansion and contraction of the electroactive material contributes to the Coulombic fade. In addition to Coulombic fade and reduced performance, the large volume changes of high-performance electroactive materials may result in limited operable lifetime by drying the electrolyte and cracking the electrode assembly.

Surprisingly, use of a semi-crystalline binder as described herein optimizes electrode performance and useful lifetime without the need for chemical cross-linking and/or chemical attachment to the electroactive material. While not being bound by theory, it is believed that semi-crystalline binders in accordance with the present disclosure optimize the mechanical strength of the electrode, the electrolyte affinity of the electrode, the ion transfer within the electrode, the contact of the semi-crystalline binder and conductive filler with surfaces of both the electroactive material and the current collector, and/or maintenance of the solid electrode interphase. Further, while not being bound by theory, it is believed that semi-crystalline binders in accordance with the present disclosure inhibit electrolyte dryout and inhibit excessive formation of the solid electrode interphase.

For example, it is believed that semi-crystalline binders in accordance with the present disclosure resist binder creep within the electrode. Further, it is believed that semi-crystalline binders in accordance with the present disclosure balance binder rigidity and binder resilience. For example, it is believed that the rigidity of the semi-crystalline binder alleviates expansion of the electroactive materials while the resilience of the semi-crystalline binder may resist electrode cracking during the expansion of the electroactive material. Yet further, semi-crystalline binders in accordance with the present disclosure allows for continued contact of both the semi-crystalline binder and an electrically conductive filler with both the electroactive material and the current collector during expansion and contraction of the electroactive material. While not being bound by theory, it is believed that the continued contact is provided at least in part because of forming strong hydrogen bonds between, for example, the binder and the electroactive material. Still yet further, semi-crystalline binders in accordance with the present disclosure balance mechanical properties of the electrode with electrolyte affinity and ionic conductance through the electrode. Additionally, semi-crystalline binders in accordance with the present disclosure prolong useful life of the electrolyte by inhibiting excessive cracking and subsequent growth of the solid electrolyte interphase.

Referring now to FIG. 1, a battery cell 10 is shown according to aspects of the present disclosure. The battery cell 10 includes a separator 12 disposed between a first electrode 14 and a second electrode 16. The separator 12 allows ionic transfer and inhibits electronic transfer therethrough.

The first electrode 14 is configured to intercalate cations while the battery cell 10 is charging and de-intercalate ions while the battery cell 10 is discharging. As will be explained further below with respect to FIG. 2, the first electrode 14 includes a first electroactive material 202, and an electrically conductive filler 204, and a semi-crystalline binder 206.

The first electrode 14 is disposed on a first current collector 18. The first current collector 18 is configured to collect and move free electrons between the first electrode 14 and the second electrode 16 via an external circuit 22. The external circuit 22 may include an external device 24 which may be a load that consumes electric power from the battery cell 10 and/or a power source that provides electric power to the battery cell 10.

The second electrode 16 is configured to intercalate the cations received from the first electrode 14 when the battery cell 10 is discharging and de-intercalate the cations for transport to the first electrode 14 while the battery cell 10 is charging. The second electrode 16 includes a second electroactive material (not illustrated) and is disposed on a second current collector 20. The second electroactive material is formed from materials cooperative with the first electroactive material 202 to facilitate ion flow and electron flow between the first electrode 14 and the second electrode 16. The second current collector 20 is configured to collect and move free electrons between the first electrode 14 and the second electrode 16 via the external circuit 22.

Each of the first electrode 14, the second electrode 16, and the separator 12 may further include an electrolyte 26. The electrolyte 26 is configured to promote movement of ions between the first electrode 14 and the second electrode 16 during charging and discharging of the lithium-ion cell 10. The electrolyte may be liquid, gel, or solid electrolyte.

Figure 2:
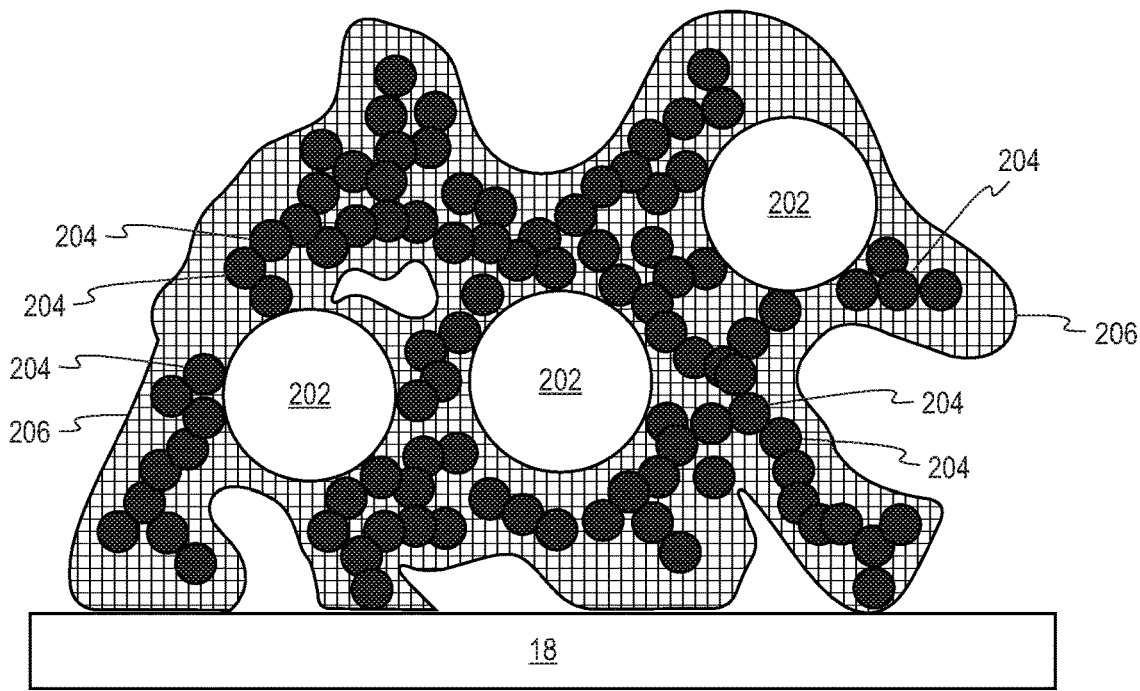
FIG. 2 illustrates a schematic view of an electrode of FIG. 1.

FIG. 2 is a schematic view of the first electrode 14 including the first electroactive material 202, the electrically conductive filler 204, and the semi-crystalline binder 206 disposed on the first current collector 18. The semi-crystalline binder 206 suspends the first electroactive material 202 and the electrically conductive filler 204.

The first electroactive material 202 is configured to receive and intercalate the cations during charging of the battery cell 10. The first electroactive material 202 is further configured to de-intercalate and release the cations during discharging of the battery cell 10. In some aspects, the cations are lithium, and the first electroactive material 202 includes lithium-graphite intercalation compounds, lithium-silicon intercalation compounds, lithium-tin intercalation compounds, lithium alloys, combinations thereof, and the like.

As used herein, the first electroactive material 202 is an electroactive material that experiences large volume changes of at least 50% during charge-discharge cycles that are within design parameters of the battery cell 10. In some aspects, the first electroactive material 202 includes silicon, silicon oxides, and/or silicon alloys. Beneficially, silicon-containing electroactive materials provide among the highest theoretical charge capacities for lithium-ion batteries, particularly in comparison to graphite.

The electrically conductive filler 204 is configured to carry charge between the first electroactive material 202 and the first current collector 18. The electrically conductive filler 204 is dispersed within the first electrode 14 in a concentration at or above the percolation threshold. The electrically conductive filler 204 may be a suitable material such as a carbon-containing material. In some aspects, the electrically conductive filler 204 is selected from the group of carbon black, carbon fiber, graphite, combinations thereof, and the like.

Figure 3:
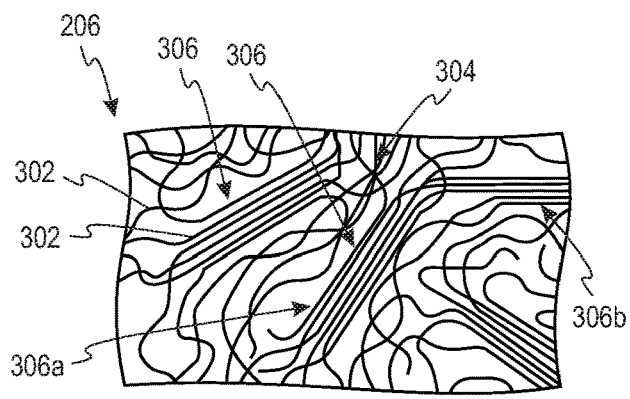
FIG. 3 illustrates a schematic view of the semi-crystalline binder of the electrode of FIG. 2.

FIG. 3 is a schematic view of the semi-crystalline binder 206. The semi-crystalline binder 206 includes a plurality of polymer chains 302. Each of the plurality of polymer chains 302 includes a plurality of amorphous sites 304 and a plurality of crystalline sites 306. Each of the plurality of amorphous sites 304 is interspersed with each of the plurality of crystalline sites 306. Each of the plurality of crystalline sites 306 is defined by repeating interactions between segments of the polymer chains 302. Beneficially, each of the plurality of polymer chains 302 includes a first crystalline site 306a including a first group of polymer chains 302 and a second crystalline site 306b including a second group of polymer chains 302

The polymer chains 302 include a high aromaticity to provide a desired rigidity, and a plurality of hydrogen bonds formed between polymer chains 302 and a surface of the first electroactive material 202 to provide improved interfacial adhesion.

In some aspects, each polymer chain 302 has an aromaticity above 25% by atom on a basis of atoms in the respective polymer chain. In some aspects, each polymer chain 302 has an aromaticity above 37% by atom on a basis of atoms in the respective polymer chain 302.

In some aspects, each polymer chain 302 includes at least one site capable of forming hydrogen bonds per repeat unit. In some aspects, each polymer chain 302 includes at least two sites capable of forming hydrogen bonds per repeat unit.

In some aspects, each polymer chain 302 includes hydrogen in an amount greater than about 15% by atom on a basis of atoms within the respective polymer chain 302. In some aspects, the polymer chains 302 are aramids. In some aspects, the polymer chains 302 are poly(m-phenylene isophthalamide).

Figure 4:
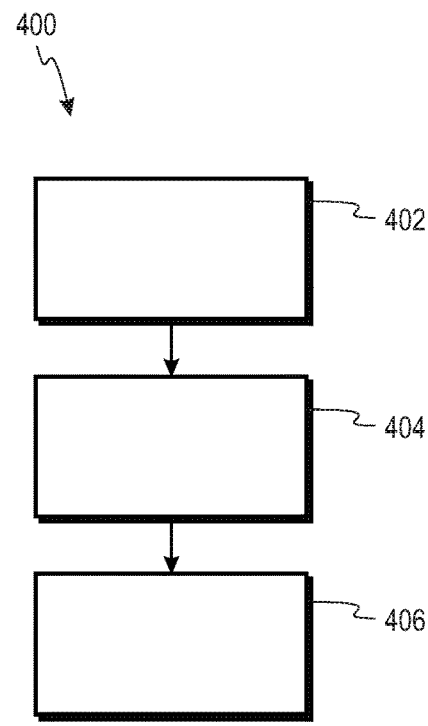
FIG. 4 illustrates a method of forming the electrode of FIG. 2.

FIG. 4 illustrates a method 400 of forming an electrode, such as the first electrode 14. The method 400 includes forming 402 an electrode slurry, applying 404 the electrode slurry to a current collector, such as the first current collector 18, and curing 406 the electrode slurry to thereby form the electrode.

The electrode slurry includes a solvent, a semi-crystalline-binder precursor solution, the first electroactive material 202, and the electrically conductive filler 204 in suitable proportions. In some aspects, on a basis of the weight of solids in the electrode slurry, the first electroactive material 202 is between about 30% and about 95% by weight, the electrically conductive filler 204 is between about 3% and about 50% by weight, and the semi-crystalline-binder precursor solution is between about 2% and about 40% by weight.

The semi-crystalline-binder precursor solution is configured to form the semi-crystalline binder 206 when cured. In some aspects, the semi-crystalline-binder precursor solution is an amorphous aramid in solution obtained by treating a crystalline aramid. For example, the treatment of the crystalline aramid may include dissolving the crystalline aramid in a salt-containing organic solution, treating the salt-containing organic solution with water to thereby form an amorphous aramid, and dissolving the amorphous aramid in a pure organic solution to produce an amorphous aramid solution. For example, the salt-containing organic solution may be a chloride-containing salt within a suitable organic solvent. In some aspects, the salt-containing organic solution is a mixture of calcium chloride or lithium chloride in N-methyl-2-pyrrolidone ("NMP"). In some aspects, the pure organic solvent is NMP.

In some aspects, the crystalline aramid is formed by mixing a first monomer with a second monomer and polymerizing the first monomer and the second monomer to form the crystalline aramid. The first monomer and the second monomer are selected to produce a polymer chain having at least 50% aromaticity by atom on a basis of atoms in the polymer chain and at least one site configured to form a hydrogen bond.

In some aspects, the semi-crystalline-binder precursor solution is an amorphous aramid solution obtained by polymerizing a first monomer and a second monomer. The first monomer and the second monomer are selected to produce a polymer chain having at least about 50% aromaticity by atom on a basis of atoms in the polymer chain and at least one site configured to form a hydrogen bond. In some aspects, the first monomer is a diamine and the second monomer is an acid chloride. For example, the diamine may be m-Phenylenediamine and the acid chloride may be isophthaloyl dichloride.

In some aspects, curing 406 the electrode slurry includes exposing the electrode slurry to a liquid electrolyte at ambient temperature for a first predetermined time. The predetermined period of time is an extended period of time, such as at least one week. Beneficially, the extended period of time may occur at points in the supply chain other than at a production facility. For example, if the lithium-ion cell 10 will not be used for at least one week, then the lithium-ion cell 10 may be constructed and shipped prior to the curing 406. In some aspects, the curing 406 includes drying the electrode and exposing the dry electrode to an elevated temperature for a first predetermined time. The elevated temperature may be between a glass-transition temperature of the semi-crystalline binder and a decomposition temperature of the semi-crystalline binder.

As used herein, the term "crystalline" should be interpreted as substantially crystalline rather than completely crystalline. While the metes and bounds of the term "substantially" is readily understood by one of ordinary skill in the art, in some aspects, the term "substantially crystalline" indicates the compound is at least 95% crystalline.

As used herein, the term "amorphous" should be interpreted as substantially amorphous rather than completely amorphous. While the metes and bounds of the term "substantially" is readily understood by one of ordinary skill in the art, in some aspects, the term "substantially amorphous" indicates the compound is at least 95% amorphous.

While the best modes for carrying out the disclosure have been described in detail, those familiar with the art to which this disclosure relates will recognize various alternative designs and embodiments for practicing the disclosure within the scope of the appended claims.

Example 1

An electrode slurry is formed by mixing, on a basis of the weight of the electrode slurry, 81% by weight of NMP, 11.4% by weight of silicon, 3.8% by weight of conductive carbon, and 3.8% by weight of aramid. The aramid is added in the form of an 8 wt % solution in NMP. The slurry is mixed until substantially homogenous. The electrode slurry is then cast on a current collector and dried at 80° C. under vacuum overnight to remove the NMP solvent to form a dry electrode. The dry electrode is heated to 275° C. and maintained at that temperature for 2 hours to induce formation of the semi-crystalline structure.

Figure 5:
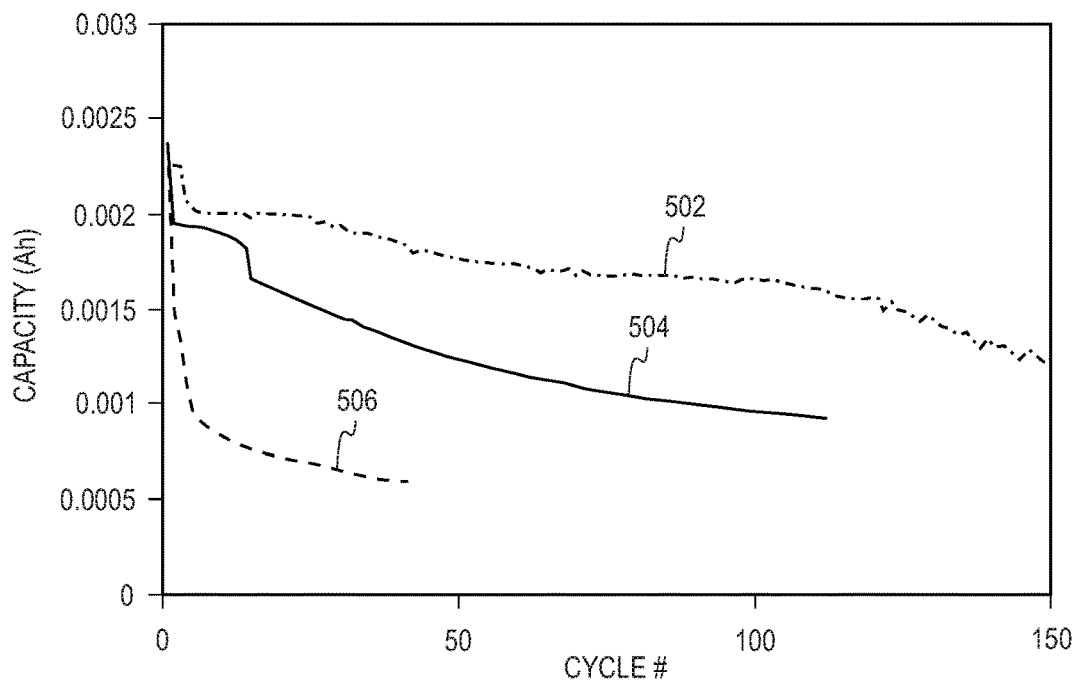
FIG. 5 illustrates a graph of capacity versus cycle number comparing an example semi-crystalline binder to other binders.

FIG. 5 is graph comparing capacity versus cycle number of the coin cell including the example semi-crystalline binder to other binders. Line 502 illustrates the capacity of the coin cell prepared having the semi-crystalline binder 206. Line 504 illustrates the capacity of a cell prepared with a carboxymethyl cellulose binder. Line 506 illustrates the capacity of a cell prepared with polyvinylidene fluoride. As can be seen, the example cell including the semi-crystalline binder exhibits greater retention of capacity as the number of cycles increases, and decreased capacity fade. For example, all three cells started with approximately 0.0024 amp-hours of capacity. After 150 cycles, the example cell provided a capacity of 0.0015 amp-hours, while this same capacity is reached after approximately 20 cycles for the carboxymethyl cellulose binder and approximately two cycles for the polyvinylidene fluoride binder.

Example 2

An electrode slurry is formed by mixing, on a basis of the weight of the electrode slurry, 81% by weight of NMP, 11.4% by weight of silicon, 3.8% by weight of conductive carbon, and 3.8% by weight of aramid. The aramid is added in the form of an 8 wt % solution in NMP. The slurry is mixed until substantially homogenous. The electrode slurry is then cast on a current collector and dried at 80° C. under vacuum overnight to remove the NMP solvent to form a dry electrode. The dry electrode is assembled into the battery cells, and the presence of the electrolyte in the cells can also induce the semi-crystalline structure formation when the cells are rested for a period of two weeks to form an electrode with a semi-crystalline aramid binder which is incorporated into a coin cell.

What is claimed is:

1. A method of forming an electrode for an electrochemical cell, the method comprising:
    forming an electrode slurry including a semi-crystalline-binder precursor solution, an electroactive material, and an electrically conductive filler, the semi-crystalline-binder precursor solution including an amorphous aramid solution obtained by:
        dissolving a crystalline aramid in a salt-containing organic solution to thereby form a solution;
        treating the solution with water to thereby form an amorphous aramid; and
        dissolving the amorphous aramid in a pure organic solution to produce the amorphous aramid solution;
    applying the electrode slurry to a current collector; and
    curing the electrode slurry to thereby form the electrode having a semi-crystalline binder, the semi-crystalline binder having the electroactive material and the electrically conductive filler dispersed therethrough, the semi-crystalline binder including a plurality of polymer chains, each of the plurality of polymer chains including a plurality of crystalline sites interspersed with a plurality of amorphous sites, each of the plurality of polymer chains being configured to form a hydrogen bond.

2. The method of claim 1, wherein the semi-crystalline-binder precursor solution includes a first monomer and a second monomer selected to produce a polymer chain having at least 25% aromaticity by atom on a basis of atoms in the polymer chain and at least one site configured to form the hydrogen bond.

3. The method of claim 1, wherein the crystalline aramid is formed by:
    mixing a first monomer and a second monomer selected to produce a polymer chain having at least 25% aromaticity by atom on a basis of atoms in the polymer chain and at least one site configured to form the hydrogen bond; and
    polymerizing the first monomer and the second monomer to form the crystalline aramid.

4. The method of claim 1, wherein each of the plurality of polymer chains includes an aromaticity greater than about 25% by atom on a basis of atoms within the respective polymer chain and a plurality of hydrogen bonds.

5. The method of claim 4, wherein each of the plurality of polymer chains includes hydrogen in an amount greater than about 15% by atom on a basis of atoms within the respective polymer chain.

6. The method of claim 1, wherein the semi-crystalline precursor is formed from a first monomer that is a diamine and a second monomer that is an acid chloride.

7. The method of claim 6, wherein the diamine is m-phenylenediamine and wherein the acid chloride is isophthaloyl dichloride.

8. The method of claim 1, wherein the semi-crystalline binder is an aramid.

9. The method of claim 8, wherein the aramid is poly(m-phenylene isophthalamide).

10. The method of claim 1, wherein curing the semi-crystalline binder includes drying the electrode, exposing the dry electrode to a liquid electrolyte, and maintaining the liquid electrolyte at ambient temperature for a predetermined time.

11. The method of claim 10, wherein the predetermined time is at least one week.

12. The method of claim 1, wherein the curing includes drying the electrode and exposing the dry electrode to an elevated temperature for a first predetermined time.

13. The method of claim 12, wherein the elevated temperature is between a glass-transition temperature of the semi-crystalline binder and a decomposition temperature of the semi-crystalline binder.

14. A method of forming an electrode for an electrochemical cell, the method comprising:
    forming an electrode slurry including a semi-crystalline-binder precursor solution, an electroactive material, and an electrically conductive filler, the semi-crystalline-binder precursor solution including an amorphous aramid solution obtained by treatment of a crystalline aramid with a salt-containing organic solution, the crystalline aramid being formed by:
        mixing first and second monomers selected to produce multiple polymer chains having at least 25% aromaticity by atom on a basis of atoms in the polymer chains and multiple sites configured to form multiple hydrogen bonds; and
        polymerizing the first and second monomers to form the crystalline aramid;
    wherein the treatment of the crystalline aramid includes:
        dissolving the crystalline aramid in the salt-containing organic solution to form an aramid-salt solution;
        treating the aramid-salt solution with water to form an amorphous aramid; and
        dissolving the amorphous aramid in a pure organic solution to produce the amorphous aramid solution;
    applying the electrode slurry to a current collector; and
    curing the electrode slurry to thereby form the electrode having a semi-crystalline binder, the semi-crystalline binder having the electroactive material and the electrically conductive filler dispersed therein, the semi-crystalline binder including the polymer chains, each of the polymer chains including multiple crystalline sites interspersed with multiple amorphous sites, one or more of the polymer chains each being configured to form one of the hydrogen bonds.

15. The method of claim 14, wherein each of the polymer chains includes hydrogen in an amount greater than about 15% by atom on a basis of atoms within the respective polymer chain.

16. The method of claim 14, wherein the first monomer includes a diamine and the second monomer includes an acid chloride.

17. The method of claim 14, wherein the semi-crystalline binder includes poly(m-phenylene isophthalamide).

18. The method of claim 14, wherein curing the semi-crystalline binder includes drying the electrode, exposing the dry electrode to a liquid electrolyte, and maintaining the liquid electrolyte at ambient temperature for a predetermined time.

19. The method of claim 14, wherein the curing includes drying the electrode and exposing the dry electrode to an elevated temperature for a first predetermined time.

20. The method of claim 19, wherein the elevated temperature is between a glass-transition temperature of the semi-crystalline binder and a decomposition temperature of the semi-crystalline binder.

* * * * *